United States Patent
Wang et al.

(10) Patent No.: US 11,412,536 B2
(45) Date of Patent: Aug. 9, 2022

(54) METHOD AND APPARATUS OF DETERMINING DOWNLINK CONTROL CHANNEL RESOURCE, USER EQUIPMENT AND BASE STATION

(71) Applicant: CHINA ACADEMY OF TELECOMMUNICATIONS TECHNOLOGY, Beijing (CN)

(72) Inventors: Lei Wang, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 244 days.

(21) Appl. No.: 16/624,262

(22) PCT Filed: Jun. 15, 2018

(86) PCT No.: PCT/CN2018/091548
§ 371 (c)(1),
(2) Date: Dec. 18, 2019

(87) PCT Pub. No.: WO2018/233566
PCT Pub. Date: Dec. 27, 2018

(65) Prior Publication Data
US 2020/0154468 A1    May 14, 2020

(30) Foreign Application Priority Data
Jun. 19, 2017    (CN) .......................... 201710464486.8

(51) Int. Cl.
*H04W 72/12*    (2009.01)
*H04W 76/27*    (2018.01)
(Continued)

(52) U.S. Cl.
CPC ..... *H04W 72/1289* (2013.01); *H04W 72/042* (2013.01); *H04W 74/0833* (2013.01); *H04W 76/27* (2018.02)

(58) Field of Classification Search
CPC ............ H04W 72/1289; H04W 76/27; H04W 72/042; H04W 74/0833; H04W 74/0866; H04W 74/006; H04W 48/12
See application file for complete search history.

(56) References Cited

U.S. PATENT DOCUMENTS

2013/0272259 A1* 10/2013 Kim ...................... H04J 11/005
                                                          370/329
2015/0103715 A1*  4/2015 Chen .................... H04L 5/0053
                                                          370/329
(Continued)

FOREIGN PATENT DOCUMENTS

CN    105612801 A     5/2016
WO    2017003047 A1   1/2017

OTHER PUBLICATIONS

"CORESETs for NR PDCCH", R1-1707379, 3GPP TSG RAN WG1 #89, Hangzhou, P.R. China, May 15-19, 2017.
(Continued)

*Primary Examiner* — Kyaw Z Soe
(74) *Attorney, Agent, or Firm* — Ladas & Parry, LLP

(57) ABSTRACT

A method and apparatus of determining a downlink control channel resource, a user equipment and a base station are provided. The method of determining a downlink control channel resource at the user equipment side includes: receiving an indication message sent by a base station, and determining, according to the indication message, a first resource set configured to transmit a UE-specific physical downlink control channel of the user equipment; or determining, according to a protocol definition, a first resource set
(Continued)

configured to transmit a UE-specific physical downlink control channel of the user equipment.

14 Claims, 4 Drawing Sheets

(51) Int. Cl.
    *H04W 72/04*     (2009.01)
    *H04W 74/08*     (2009.01)

(56) References Cited

U.S. PATENT DOCUMENTS

2016/0242169 A1*   8/2016  Park ...................... H04L 1/1812
2018/0176903 A1    6/2018  Lee et al.
2018/0317202 A1*  11/2018  Chang ................... H04W 76/19

OTHER PUBLICATIONS

"Discussion on the CORESET for RMSI delivery", R1-1710233, 3GPP TSG RAN WG1 NR Ad-Hoc#2, Qingdao, P.R. China, Jun. 27-30, 2017.
"4-step PRACH procedures", R1-1710513, 3GPP TSG RAN WG1 NR Ad-Hoc #2, Qingdao, P.R. China, Jun. 27-30, 2017.
Communication Pursuant to Article 94(3) EPC from EP app. No. 18821235.1, dated Dec. 9, 2020.
Notice of Reasons for Refusal from JP app. No. 2019-570519, dated Jan. 5, 2021, with English translation from Global Dossier.
First Office Action and search report from CN app. No. 201710464486.8, dated Mar. 19, 2020, with English translation provided by Global Dossier.
Extended European Search Report from EP app. No. 18821235.1, dated Apr. 24, 2020.
International Search Report from PCT/CN2018/091548, dated Sep. 5, 2018, with English translation provided by WIPO.
Written Opinion of the International Searching Authority from PCT/CN2018/091548, dated Sep. 5, 2018, with English translation provided by WIPO.
International Preliminary Report on Patentability from PCT/CN2018/091548, dated Dec. 24, 2019, with English translation provided by WIPO.
"Design of control resource set", R1-1700014, 3GPP TSG RAN WG1 NR Ad Hoc Meeting, Spokane USA, Jan. 16-20, 2017.
"NR DL Control Channel Structure", R1-1701585, 3GPP TSG RAN WG1 Meeting #88, Athens Greece, Feb. 14-17, 2017.
"Configuration aspects of the NR-PDCCH". R1-1707497, 3GPP TSG RAN WG1 Meeting #89, Hangzhou, P.R. China, May 15-19, 2017.
"Flexible reuse DL control resources for data transmission", R1-1707498, 3GPP TSG RAN WG1 Meeting #89, Hangzhou, P.R. China, May 15-19, 2017.
"Configuration aspects of the NR-PDCCH", R1-1710076, 3GPP TSG RAN WG1 Ad-Hoc#2, Qingdao, P.R. China, Jun. 27-30, 2017.
"Discussion of CORESET configuration", R1-1710305, 3GPP TSG RAN WG1 Ad-Hoc#2, Qingdao, P.R. China, Jun. 27-30, 2017.
"Discussion on remaining system information delivery", R1-1710841, 3GPP TSG RAN WG1 Ad-Hoc#2, Qingdao, P.R. China, Jun. 27-30, 2017.
"Flexible reuse of DL control resources for data transmission", R1-1712395, 3GPP TSG RAN WG1 Meeting #90, Prague, Czechia, Aug. 21-25, 2017.
Notification of Reason for Refusal from KR app. No. 10-2020-7001486, dated Jun. 21, 2021, with English translation from Global Dossier.
"Resource sharing between PDCCH and PDSCH", R1-1701587, 3GPP TSG RAN WG1 Meeting #88, Athens, Greece Feb. 13-17, 2017.
Notice of Reasons for Refusal from JP app. No. 2019-570519, dated Sep. 14, 2021, with English translation from Global Dossier, all pages.
Third Japanese Office Action for Japanese Patent Application 2019-570519 dated Apr. 26, 2022 and English translation provided by the Japanese Patent Office.
"Discussion on PBCH contents," 3GPP TSG RAN WG1 Meeting Ad-Hoc#2, R1-1710797, Source: MediaTech Inc. Agenda Item: 5.1.1.2.1, Jun. 17, 2017.

* cited by examiner

METHOD AND APPARATUS OF DETERMINING DOWNLINK CONTROL CHANNEL RESOURCE, USER EQUIPMENT AND BASE STATION

CROSS-REFERENCE TO RELATED APPLICATIONS

This application is the U.S. national phase of PCT application No. PCT/CN2018/091548 filed on Jun. 15, 2018, which claims a priority to Chinese Patent Application No. 201710464486.8 filed on Jun. 19, 2017, the disclosures of which are incorporated in their entireties by reference herein.

TECHNICAL FIELD

The present disclosure relates to the field of communication technologies, in particular to a method and an apparatus of determining a downlink control channel resource, a user equipment and a base station.

BACKGROUND

The mobile Internet is subverting the traditional mobile communication service model to provide users with unprecedented experience, which has a profound impact on all aspects of people's work and life. The mobile Internet will promote the further upgrading of human social information interaction modes, and provides users with richer service experience such as the augmented reality, the virtual reality, the ultra high definition video, and the mobile cloud and so on. Therefore, the further development of mobile Internet will bring about thousand times increase in mobile traffic in the future, and will promote a new round of changes in the mobile communication technologies and industries.

In addition, the Internet of Things expands the service coverage of the mobile communication, from the human-to-human communication to the intelligent interconnection of human and things, and things and things, enabling mobile communication technologies to penetrate into a wider range of industries and fields. In the future, the mobile medical, the Internet of Vehicles, the Intelligent Home, the industrial control, and the environmental monitoring, etc. will promote the explosive growth of the IoT applications, and hundreds of billions of devices will access the network to achieve a true "Internet of Everything". At the same time, massive device connectivity and diverse IoT services will also bring a new technical challenge to the mobile communication.

Therefore, as emergence and rich of new service requirements, higher performance requirements are required for future mobile communication systems, such as the higher peak rates, the better user experience rates, the smaller latency, and the higher reliability, the higher spectral efficiency, and the higher energy efficiency, etc., and more user access and the use of various service types are required to be supported. Therefore, the terminal may be required to support multiple transmission modes, multiple scenarios, and the use of various service types. Furthermore, the complexity and power consumption requirements of the terminal are also more stringent.

For example, if the terminal is required to listen to the downlink control channel over the entire transmission bandwidth, a great challenge will be brought to the power consumption control of the terminal and the delay at the terminal side will be increased. On the other hand, for the improvement of resource utilization requirement and requirements on some further application scenarios (such as frequency domain inter-cell interference coordination), it is necessary to configure transmission resources of a downlink control channel more flexibly.

The physical downlink control channel (PDCCH) and the enhanced physical downlink control channel (EPDCCH) in the downlink control channel of the LTE system in the related art are described below.

For the PDCCH, it is used to carry scheduling information and other control information. There are PDCCHs in the control area of each downlink subframe, the size of the control area is determined by the Physical Control Format Indicator Channel (PCFICH), which occupies 1 to 4 Orthogonal Frequency Division Multiplexing (OFDM) symbols. Transmission of one control channel occupies one Control Channel Element (CCE) or multiple consecutive CCEs, each CCE is composed of 9 Resource Element Groups (REGs), and the REGs included in the CCE of the PDCCH are REGs that are not used for carrying the PCFICH and the Physical Hybrid Automatic Retransmission Indicator Channel (PHICH). The PDCCH supports multiple formats to adapt different requirements, and the specific supported formats are shown in Table 1.

TABLE 1 format supported by the PDCCH

| PDCCH format | Quantity of CCEs | Quantity of REGs | Quantity of information bits of PDCCH |
|---|---|---|---|
| 0 | 1 | 9 | 72 |
| 1 | 2 | 18 | 144 |
| 2 | 4 | 36 | 288 |
| 3 | 8 | 72 | 576 |

The user equipment listens for a PDCCH candidate set in a non-discontinuous reception (non-DRX) subframe, that is, each PDCCH in a search space is attempted to be decoded according to the format of the downlink control information (DCI) to be listened for. The search space is classified into a UE-specific type and a cell-specific type. The quantity of possible PDCCH candidates in different search spaces is shown in Table 2.

TABLE 2

PDCCH candidates listened for by one user equipment

Search space $S_k^{(L)}$

| Type | Aggregation level L | Number in CCE | PDCCH candidates'number $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Cell-specific | 4 | 16 | 4 |
|  | 8 | 16 | 2 |

The search space of the aggregation level $L \in \{1, 2, 4, 8\}$ is composed of multiple PDCCH candidates, and the number in the CCE corresponding to one PDCCH candidate is given by the following formula.

$$L\{(Y_k+m) \bmod \lfloor N_{CCE,K}/L \rfloor\}+i;$$

The m=0, ..., $M^{(L)}-1$; the i=0, ..., L−1; the $N_{CCE,K}$ is a quantity of the CCEs used to carry the PDCCH, the $Y_k$ is defined as $Y_k=(A*Y_{k-1}) \mod D$, where the $Y_{-1}=n_{RNTI}\neq 0$, the A=39827, the D=65537, the $k=\lfloor n_s/2 \rfloor$, and the $n_s$ is a slot number in a radio frame.

When a base station allocates a resource for the PDCCH, a collision between different PDCCHs is required to avoid, that is, when a certain CCE or several CCEs have been occupied by the PDCCH, the CCE is no longer allocated to other PDCCHs.

For the EPDCCH, it transmits in data area in the subframe, and cannot occupy transmission space of the PDCCH. Similar to the PDCCH, the concept of an Enhanced Resource Element Group (EREG) and an Enhanced Control Channel Element (ECCE) is introduced, as described below.

For a division of a quantity of the EPDCCH blind detection, it is defined by means of a protocol reservation, and a table of E-PDCCH candidate division is given respectively according to the scenario.

The formula of the EPDCCH search space is defined as:

$$L\left\{\left(Y_{p,k} + \left\lfloor \frac{m*N_{ECCE,p,K}}{L*M_p^{(L)}} \right\rfloor + b \right) \mod \left\lfloor \frac{N_{ECCE,p,K}}{L} \right\rfloor \right\} + i;$$

The $b=n_{CI}$, when intra-carrier scheduling is performed, the $n_{CI}=0$; when cross-carrier scheduling is performed, the $n_{CI}$ is carrier indication information;

The p is a physical resource block set (PRB-set), the L is aggregation level, the m=0, . . . , $M_p^{(L)}-1$; and the i=0, . . . , L−1;

The $Y_{p,-1}=n_{RNTI}\neq 0$, the $A_0$=39827, the $A_1$=39829, the D=65537, and the $k=\lfloor n_s/2 \rfloor$.

In general, in the LTE system, a resource position occupied by the control area in one subframe: for the PDCCH, control area thereof occupies the preceding N OFDM symbols in one subframe, the N is determined by the PCFICH, the entire scheduling bandwidth in the frequency domain is occupied; for the EPDCCH, control area thereof is determined by the PRB set configured by the high layer.

However, in the further mobile communication system, the control resource set (CORESET) configured to transmit the UE-specific (UE-specific) physical downlink control channel of the user equipment is configured by a radio resource control signaling (RRC signaling). However, when the terminal does not establish an RRC connection and is switched to the connected state, how to determine the resource set of UE-specific PDCCH thereof, that is, how to determine the resource set of UE-specific PDCCH scheduling a first RRC signaling, there is no clear solution currently, which leads to the inflexible configuration of the transmission resources of the downlink control channel in the future mobile communication systems.

SUMMARY

A method and an apparatus of determining a downlink control channel resource, a user equipment and a base station are provided in some embodiments of the present disclosure, a resource set configured to transmit a UE-specific physical downlink control channel of the user equipment may be configured for the user equipment that does not established an RRC connection according to the manner indicated by the base station or a pre-defined manner, thereby configuring the resources flexibly.

A method of determining a downlink control channel resource is provided in some embodiments of the present disclosure, including:

receiving an indication message sent by a base station, and determining, according to the indication message, a first resource set configured to transmit a UE-specific physical downlink control channel of a user equipment; or determining the first resource set configured to transmit the UE-specific physical downlink control channel of the user equipment according to a protocol definition.

Subsequent to the determining the first resource set configured to transmit the UE-specific physical downlink control channel of the user equipment, the method further includes:

detecting, in the first resource set, the UE-specific physical downlink control channel of the user equipment.

Subsequent to the detecting, in the first resource set, the UE-specific physical downlink control channel of the user equipment, the method further includes:

receiving, on the detected UE-specific physical downlink control channel of the user equipment, scheduling information of a first radio resource control signaling after the user equipment accesses a network; and receiving the first radio resource control signaling according to the scheduling information of the first radio resource control signaling, where the first radio resource control signaling carries configuration information of a second resource set of the UE-specific physical downlink control channel configured by the base station for the user equipment.

Subsequent to the receiving the first radio resource control signaling according to the scheduling information of the first radio resource control signaling, the method further includes:

determining the second resource set according to the configuration information of the second resource set carried in the received first radio resource control signaling; and detecting and receiving, in the second resource set, control information transmitted on the UE-specific physical downlink control channel of the user equipment.

The receiving the indication message sent by the base station, and determining, according to the indication message, the first resource set configured to transmit the UE-specific physical downlink control channel of the user equipment includes:

receiving a message sent by the base station in a random access procedure of the user equipment, and determining the first resource set according to indication information of the first resource set carried in the message.

The receiving the indication message sent by the base station, and determining, according to the indication message, the first resource set configured to transmit the UE-specific physical downlink control channel of the user equipment includes:

receiving an RMSI message sent by the base station, and determining the first resource set according to indication information of the first resource set carried in the RMSI message;

where the RMSI message is a system message other than a system message being a Master Information Block MIB message.

The receiving the indication message sent by the base station, and determining, according to the indication message, the first resource set configured to transmit the UE-specific physical downlink control channel of the user equipment includes:

receiving an MIB message sent by the base station, and determining a resource set which is obtained from the MIB message and used configured to transmit a common control channel as the first resource set.

The determining the first resource set configured to transmit the UE-specific physical downlink control channel of the user equipment according to the protocol definition includes:
determining starting position information of the first resource set in the protocol definition, based on a radio network temporary identity of the user equipment; and
determining the first resource set according to the starting position information of the first resource set and a pre-acquired size of the first resource set.

The pre-acquired size of the first resource set is predefined in the protocol definition; or
the pre-acquired size of the first resource set is obtained by the user equipment from a message sent by the base station in a random access procedure of the user equipment, or is obtained by the user equipment from an RMSI message or an MIB message sent by the base station;
where the RMSI message is a system message other than a system message being an MIB message.

The message sent by the base station in the random access procedure of the user equipment is an Msg2 or an Msg4.

A method for determining a downlink control channel resource is further provided in some embodiments of the present disclosure, including:
sending an indication message to a user equipment, where the indication message is configured to enable the user equipment to determine a first resource set configured to transmit a UE-specific physical downlink control channel of the user equipment.

Subsequent to the sending an indication message to a user equipment, the method further includes:
sending, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling;
configuring, for the user equipment, a second resource set configured to transmit the UE-specific physical downlink control channel of the user equipment; and
sending to the user equipment configuration information of the second resource set as information carried in the first radio resource control signaling.

Subsequent to the sending to the user equipment the configuration information of the second resource set as the information carrying in the first radio resource control signaling, the method further includes:
in the second resource set, transmitting control information on the UE-specific physical downlink control channel of the user equipment.

The sending the indication message to the user equipment includes:
sending to the user equipment the indication information of the first resource set as information carried in a message sent by the base station to the user equipment in a random access procedure of the user equipment.

The sending the indication message to the user equipment includes:
sending to the user equipment the indication information of the first resource set as information carried in an RMSI message;
where the RMSI message is a system message other than a system message being a Master Information Block MIB message.

The sending the indication message to the user equipment includes:
sending an MIB message to the user equipment, to enable the user equipment to determine a resource set which is obtained from the MIB message and used configured to transmit a common control channel as the first resource set.

The method further includes:
sending to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

The message sent by the base station in the random access procedure of the user equipment is an Msg2 or an Msg4.

A user equipment is further provided in some embodiments of the present disclosure, including:
a first determination module, configured to receive an indication message sent by a base station, and determine, according to the indication message, a first resource set configured to transmit a UE-specific physical downlink control channel of a user equipment; or
a second determination module, configured to determine the first resource set configured to transmit the UE-specific physical downlink control channel of the user equipment according to a protocol definition.

The user equipment further includes:
a channel detection module, configured to detect, in the first resource set, the UE-specific physical downlink control channel of the user equipment.

The user equipment further includes:
a scheduling information receiving module, configured to receive, on the detected UE-specific physical downlink control channel of the user equipment, scheduling information of a first radio resource control signaling after the user equipment accesses a network; and
a signaling receiving module, configured to receive the first radio resource control signaling according to the scheduling information of the first radio resource control signaling, where the first radio resource control signaling carries configuration information of a second resource set of the UE-specific physical downlink control channel configured by the base station for the user equipment.

The user equipment further includes:
a third determination module, configured to determine the second resource set according to the received configuration information of the second resource set carried in the first radio resource control signaling; and
a control information receiving module, configured to detect and receive, in the second resource set, control information transmitted on the UE-specific physical downlink control channel of the user equipment.

The first determination module includes:
a first receiving unit, configured to receive a message sent by the base station in a random access procedure of the user equipment, and determine the first resource set according to indication information of the first resource set carried in the message.

The first determination module includes:
a second receiving unit, configured to receive an RMSI message sent by the base station, and determine the first resource set according to indication information of the first resource set carried in the RMSI message;
where the RMSI message is a system message other than a system message being a Master Information Block MIB message.

The first determination module includes:
a third receiving unit, configured to receive an MIB message sent by the base station, and determine a resource set which is obtained from the MIB message and used configured to transmit a common control channel as the first resource set.

The second determination module includes:
a starting position determination module, configured to, determine starting position information of the first resource set in the protocol definition based on a radio network temporary identity of the user equipment; and
a resource set determination module, configured to determine the first resource set according to the starting position information of the first resource set and a pre-acquired size of the first resource set.

The pre-acquired size of the first resource set is predefined in the protocol definition; or
the pre-acquired size of the first resource set is obtained by the user equipment from a message sent by the base station in a random access procedure of the user equipment, or is obtained by the user equipment from an RMSI message or an MIB message sent by the base station;
where the RMSI message is a system message other than a system message being an MIB message.

The message sent by the base station in the random access procedure of the user equipment is an Msg2 or an Msg4.

A user equipment is further provided in some embodiments of the present disclosure, including a first memory, a first processor and a computer program stored in the first memory and executable on the first processor; where the first processor executes the program to implement the following steps:
receiving an indication message sent by a base station, and determining, according to the indication message, a first resource set configured to transmit a UE-specific physical downlink control channel of a user equipment; or
determining the first resource set configured to transmit the UE-specific physical downlink control channel of the user equipment according to a protocol definition.

A computer readable storage medium having a computer program stored thereon is further provided in some embodiments of the present disclosure, where the program is executed by a processor to implement the following steps:
receiving an indication message sent by a base station, and determining, according to the indication message, a first resource set configured to transmit a UE-specific physical downlink control channel of a user equipment; or
determining the first resource set configured to transmit the UE-specific physical downlink control channel of the user equipment according to a protocol definition.

A base station is further provided in some embodiments of the present disclosure, including:
an indication module, configured to send an indication message to a user equipment, where the indication information is configured to enable the user equipment to determine a first resource set configured to transmit a UE-specific physical downlink control channel of the user equipment.

The base station further includes:
a scheduling information sending module, configured to send, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling;
a resource configuration module, configured to configure, for the user equipment, a second resource set configured to transmit the UE-specific physical downlink control channel of the user equipment; and
a signaling sending module, configured to send to the user equipment configuration information of the second resource set as information carried in the first radio resource control signaling.

The base station further includes:
a control information transmission module, configured to, in the second resource set, transmit control information on the UE-specific physical downlink control channel of the user equipment.

The indication module includes:
a first sending unit, configured to send to the user equipment the indication information of the first resource set as information carried in a message sent by the base station in a random access procedure of the user equipment.

The indication module includes:
a second sending unit, configured to send to the user equipment the indication information of the first resource set as information carried in an RMSI message;
where the RMSI message is a system message other than a system message being a Master Information Block MIB message.

The indication module includes:
a third sending unit, configured to send an MIB message to the user equipment, to enable the user equipment to determine a resource set which is obtained from the MIB message and used configured to transmit a common control channel as the first resource set.

The base station further includes:
a resource size sending module, configured to send to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

The message sent by the base station in the random access procedure of the user equipment is an Msg2 or an Msg4.

A base station is further provided in some embodiments of the present disclosure, including a second memory, a second processor and a computer program stored in the second memory and executable on the second processor; where the second processor executes the program to implement the following step:

sending an indication message to a user equipment, the indication information is configured to enable the user equipment to determine a first resource set configured to transmit a UE-specific physical downlink control channel of the user equipment.

A computer readable storage medium having a computer program stored thereon is further provided in some embodiments of the present disclosure, where the program is executed by a processor to implement the following step:

sending an indication message to a user equipment, the indication information is configured to enable the user equipment to determine a first resource set configured to transmit a UE-specific physical downlink control channel of the user equipment.

For the user equipment that does not establish an RRC connection, the base station cannot configure, by using an RRC signaling, the resource set configured to transmit the UE-specific physical downlink control channel for the user equipment that does not establish the RRC connection. According to the some embodiments of the present disclosure, the resource set configured to transmit the UE-specific physical downlink control channel of the user equipment is determined in the manner indicated by the base station or in the predefined manner. As a result, by applying some embodiments of the present disclosure, the resource set configured to transmit the UE-specific physical downlink control channel of the user equipment may be configured for the user equipment that does not established an RRC connection, according to the manner indicated by the base station or the pre-defined manner, thereby configuring the resources flexibly.

DETAILED DESCRIPTION

In order to make the technical problems, the technical solutions, and the advantages of the present disclosure more clearly, the following detailed description will be made with reference to the accompanying drawings and specific embodiments. In the following description, specific details such as specific configurations and specific details of the component are merely provided to assist a comprehensive understanding of some embodiments of the present disclosure. Accordingly, those of ordinary skill in the art will recognize that various changes and modifications of the embodiments described herein may be made without departing from the scope and spirit of the disclosure. In addition, descriptions of well-known functions and constructions are omitted for clarity and conciseness.

It should be understood that, reference throughout the specification to one embodiment or an embodiment means that a particular feature, structure, or characteristic described in connection with the embodiment is included in at least one embodiment of the disclosure. Thus, "in one embodiment" or "in an embodiment" throughout the specification does not necessarily refer to the same embodiment. Furthermore, the particular features, structures, or characteristics may be combined in any suitable manner in one or more embodiments.

In various embodiment of the present disclosure, it should be understood that, the sequence numbers of the following processes do not imply a sequence of execution orders, and the order of execution of each process should be determined by its function and internal logic, and should not constitute any limitation on the implementation process of the embodiments of the present disclosure.

Additionally, the terms "system" and "network" are used interchangeably herein.

In the embodiments provided by the present application, it should be understood that "B corresponding to A" means that B is associated with A, and B can be determined according to A. However, it should also be understood that determining B according to A does not mean that B is only determined based on A, and that B can also be determined based on A and/or other information.

Specifically, some embodiments of the present disclosure provide a method for determining a downlink control channel resource, which solves the problem in the related art that a resource set configured to transmit a UE-specific physical downlink control channel cannot be configured for a user equipment that does not establish an RRC connection.

Figure 1:
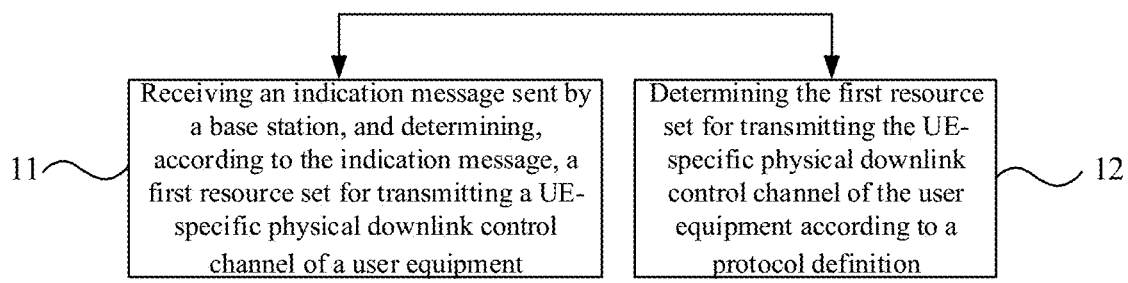
FIG. 1 is a flowchart illustrating a method of determining a downlink control channel resource at a user equipment side in some embodiments of the present disclosure.

As shown in FIG. 1, a method of determining a downlink control channel resource is provided in some embodiments of the present disclosure, which includes the following steps.

In step 11, an indication message sent by a base station is received, and a first resource set configured to transmit a UE-specific physical downlink control channel of a user equipment is determined according to the indication message; or In step 12, the first resource set configured to transmit the UE-specific physical downlink control channel of the user equipment is determined according to a protocol definition.

The method for determining a downlink control channel resource of the embodiment of the present disclosure is applied for a user equipment. The user equipment does not establish an RRC connection, thus a base station cannot configure, by the RRC signaling, a resource set configured to transmit the UE-specific physical downlink control channel for the user equipment that does not establish an RRC connection.

In some embodiments of the present disclosure, the resource set configured to transmit the UE-specific physical downlink control channel of the user equipment is determined in a manner indicated by a base station or in a predefined manner. Therefore, by applying some embodiments of the present disclosure, a resource set configured to transmit a UE-specific physical downlink control channel of the user equipment is configured for the user equipment, that does not established an RRC connection, in the manner indicated by the base station or in the predefined manner, and the flexible configuration of resources is realized.

The indication message is a message sent by the base station that can be received before the user equipment does not establish an RRC connection, and the indication information of the first resource set configured to transmit the UE-specific physical downlink control channel of the user equipment is carried in the indication message, so that the user equipment can determines the first resource set of transmitting its own UE-specific physical downlink control channel from the indication information of the first resource set carried in the received indication message before the RRC connection thereof is established.

In addition, the protocol definition includes indication information of the first resource set of the UE-specific physical downlink control channel configured for the user equipment. Thus, for the user equipment that does not establish an RRC connection, the first resource set specified in the protocol definition may be used by default to transmit its own UE-specific physical downlink control channel.

Further, after the determining a first resource set configured to transmit a UE-specific physical downlink control channel of a user equipment, the method further includes: in the first resource set, detecting the UE-specific physical downlink control channel of the user equipment.

That is, for the user equipment that does not establish an RRC connection, after determining the first resource set configured to transmit the UE-specific physical downlink control channel by the step 11 or the step 12, control information transmitted on its own UE-specific physical downlink control channel may be detected and received in the first resource set, so that the user equipment that does not establish the RRC connection can receive the RRC signaling successfully.

In the first resource set, the detailed process of detecting the UE-specific physical downlink control channel of the user equipment is as follows.

The user equipment performs a blind detection on its own DCI in the UE-specific search space within the first resource set according to downlink control information format (DCI format) expected to be received, and checks the received DCI according to the cyclic redundancy check (CRC) scrambled with its own identity. If the check is successful, the information domain in the DCI is parsed to obtain the control information carried in the DCI.

Further, in the first resource set, after the step of detecting the UE-specific physical downlink control channel of the user equipment, the method further includes: on the detected UE-specific physical downlink control channel of the user equipment, receiving scheduling information of a first radio resource control signaling after the user equipment accesses a network; and receiving the first radio resource control signaling according to the scheduling information of the first radio resource control signaling, where the first radio resource control signaling carries configuration information of a second resource set of the UE-specific physical downlink control channel configured by the base station for the user equipment.

After detecting the UE-specific physical downlink control channel of the user equipment in the first resource set, the user equipment receives control information transmitted on the channel. The control information transmitted on the channel includes scheduling information for scheduling the first RRC signaling after the user equipment accesses the network, and the schedule information can indicate the user equipment how to receive the first RRC signaling sent by the base station after the user equipment accesses the network.

In addition, after the user equipment accesses the network, the first RRC signaling sent by the base station carries configuration information of the second resource set, reconfigured by the base station for the user equipment, configured to transmit the UE-specific physical downlink control channel of the user equipment. Therefore, the user equipment can obtain the configuration information of the second resource set carried in the first RRC signaling according to the scheduling information of the received first RRC signaling, and then determine the second resource set according to the configuration information of the second resource set.

Therefore, as can be seen from the above, the first resource set determined in the step 11 or the step 12 may also be used to schedule the first RRC signaling sent by the base station after the user equipment accesses the network, so that the user equipment can receive the second resource set of the UE-specific physical downlink control channel reconfigured by the base station for the user equipment.

Further, after the step of receiving the first radio resource control signaling according to the scheduling information of the first radio resource control signaling, the method further includes: determining the second resource set according to the configuration information of the second resource set carried in the received first radio resource control signaling; and detecting and receiving, in the second resource set, control information transmitted on the UE-specific physical downlink control channel of the user equipment.

Optionally, the step 11 includes: receiving a message sent by the base station in a random access procedure of the user equipment, and determining the first resource set according to indication information of the first resource set carried in the message. Further, the message sent by the base station in the random access procedure of the user equipment is an Msg2 or an Msg4.

That is, in the random access procedure of the user equipment, the base station can carry the indication information of the first resource set in one of the messages sent to the user equipment, to notify the user equipment of the first resource set.

Optionally, the step 11 includes: receiving an RMSI message sent by the base station, and determining the first resource set according to indication information of the first resource set carried in the RMSI message; where the RMSI message is a system message other than a system message being an MIB message.

The RMSI message is valid for all user equipments, so the first resource set configured by the RMSI message is shared for all user equipments that received the RMSI message successfully.

Optionally, the step 11 includes: receiving an MIB message sent by the base station, and determining a resource set which is obtained from the MIB message and used configured to transmit a common control channel as the first resource set. That is, the resource set used to transmit the common control channel can be directly used as the first resource set.

Optionally, the step 12 includes: determining starting position information of the first resource set in the protocol definition, based on a radio network temporary identity of the user equipment; and determining the first resource set according to the starting position information of the first resource set and a pre-acquired size of the first resource set.

The starting position information of the first resource set of each user equipment is divided according to the radio network temporary identifier (RNTI) of each user equipment in the pre-protocol definition, so that the user equipment can directly search the starting position of the first resource set in the protocol definition according to the RNTI of the user equipment. The first resource set is determined in combination with the pre-acquired size of the first resource set.

In addition, the pre-acquired size of the first resource set is predefined in the protocol definition; the pre-acquired size of the first resource set is obtained by the user equipment from the message sent by the base station in the random access procedure of the user equipment, or obtained by the user equipment from the RMSI message or the MIB message sent by the base station; the RMSI message and an MIB message are different and included in a system message. Further, the message sent by the base station in the random access procedure of the user equipment is an Msg2 or an Msg4.

That is, the size of the first resource set can be determined in a predefined manner, and can also be notified to the user equipment through an explicit signaling. The specific manner of the explicit signaling may be: any one of the Msg2, the Msg4, the RMSI message and the MIB message.

In summary, the manner of determining the first resource set configured to transmit the UE-specific physical downlink control channel of the user equipment may be a protocol definition manner or an explicit signaling manner, where the specific manner of the explicit signaling may be: any one of the Msg2, the Msg4, the RMSI message and the MIB message. It can be seen that, in the embodiment of the present disclosure, the manner of determining the first resource set configured to transmit the UE-specific physical downlink control channel of the user equipment is very flexible.

Figure 2:
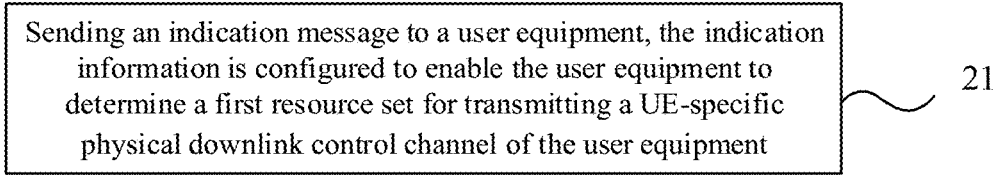
FIG. 2 is a flowchart illustrating a method of determining a downlink control channel resource at a base station side in some embodiments of the present disclosure.

As shown in FIG. 2, a method for determining a downlink control channel resource is provided in some embodiments of the present disclosure, which includes the following steps.

In step 21, an indication message is sent to a user equipment, the indication information is configured to enable the user equipment to determine a first resource set configured to transmit a UE-specific physical downlink control channel of the user equipment.

The method for determining downlink control channel resource of the embodiment of the present disclosure is applied for a base station. For a user equipment that does not establish an RRC connection, the base station cannot configure, by using the RCC signaling, a resource set configured to transmit the UE-specific physical downlink control channel for the user equipment that does not establish an RRC connection.

According to the some embodiments of the present disclosure, the base station determines the resource set configured to transmit the UE-specific physical downlink control channel of the user equipment by means of indication. As a result, by applying some embodiments of the present disclosure, a resource set configured to transmit a UE-specific physical downlink control channel of the user equipment is determined for the user equipment that does not established an RRC connection according to the manner indicated by the base station, and the flexible configuration of resources is realized.

The indication message is a message sent by the base station that can be received before the user equipment is switched to a connected state, and the indication information of the first resource set configured to transmit the UE-specific physical downlink control channel of a user equipment is carried in the indication message, so that even though the use equipment does not establish the RRC connection, the first resource set configured to transmit its own UE-specific physical downlink control channel may be configured according to indication information of the first resource set carried in the received indication message before the user equipment is switched to the connected state.

Further, after the step 21, the method further includes:
sending, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling;
configuring, for the user equipment, a second resource set configured to transmit the UE-specific physical downlink control channel of the user equipment; and
sending to the user equipment configuration information of the second resource set as information carried in the first radio resource control signaling.

The user equipment determines, according to the indication message sent by the base station, the first resource set configured to transmit its own UE-specific physical downlink control channel, and detects and receives, in the first resource set, the control information transmitted on its own UE-specific physical downlink control channel, so that the user equipment can obtain, from the control information, scheduling information for scheduling the first radio resource control signaling after the user equipment accesses the network, and then the first RRC signaling, that is sent by the base station and carries configuration information of a second resource set reconfigured by the base station for the user equipment, configured to transmit the UE-specific physical downlink control channel of the user equipment, is received according to the scheduling information.

Therefore, as can be seen from the above, the first resource set indicated by the base station to the user equipment in the step 21 may also be used to schedule the first RRC signaling sent by the base station after the user equipment accesses the network, so that the user equipment can receive the second resource set of the UE-specific physical downlink control channel reconfigured by the base station for the user equipment.

Further, after the step of sending configuration information of the second resource set to the user equipment as carrying information of the first radio resource control signaling, the method further includes: in the second resource set, transmitting control information on the UE-specific physical downlink control channel of the user equipment.

Optionally, the step 21 includes: sending the indication information of the first resource set to the user equipment as carrying information of a message sent by the base station to the user equipment in a random access procedure of the user equipment. Further, the message sent by the base station is an Msg2 or an Msg4 in the random access procedure of the user equipment.

That is, in a random access procedure of the user equipment, the base station can carry the indication information of the first resource set in one of the messages sent to the user equipment, to notify the user equipment of the first resource set.

Optionally, the step 21 includes: sending to the user equipment the indication information of the first resource set as information carried in an RMSI message; where the RMSI message is a system message other than a system message being an MIB message.

The RMSI message is valid for all user equipments, so the first resource set configured by the RMSI message is shared for all user equipments that received the RMSI message successfully.

Optionally, the step 21 includes: sending an MIB message to the user equipment, so that the user equipment determines a resource set which is obtained from the MIB message and used configured to transmit a common control channel, as the first resource set. That is, the base station notifies, through the MIB message, the user equipment of the resource set used configured to transmit the common control channel, so that the resource set used configured to transmit the common control channel can be directly used as the first resource set by the user equipment.

Optionally, the method further includes: sending to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment. Further, the message sent by the base station is an Msg2 or an Msg4 in the random access procedure of the user equipment.

That is, for the first resource set configured to transmit the UE-specific physical downlink control channel of the user equipment, the user equipment may also determine by using a protocol definition manner. The starting position information of the first resource set of each user equipment is divided according to the radio network temporary identifier (RNTI) of each user equipment in the pre-protocol definition, so that the user equipment can directly search the starting position of the first resource set in the protocol definition according to the RNTI of the user equipment. The first resource set is determined in combination with the pre-acquired size of the first resource set.

The size of the first resource set can also be notified by the base station to the user equipment through an explicit signaling. That is, the base station sends the size of the first resource set as the RMSI message, or the MIB message, or the carrying information of the message sent by the base station in the random access procedure of the user equipment to the user equipment.

In summary, the manner of determining the first resource set configured to transmit the UE-specific physical downlink control channel of the user equipment may be notified by the base station through the explicit signaling, where the specific manner of the explicit signaling may be: any one of the Msg2, the Msg4, the RMSI message and the MIB message. It can be seen that, in the embodiment of the present disclosure, the manner of determining the first resource set configured to transmit the UE-specific physical downlink control channel of the user equipment is very flexible.

It can be seen from the foregoing first embodiment and the second embodiment that the specific implementation manner of the method for determining the downlink control channel resource of the embodiment of the present disclosure may include the following four types.

Figure 3:
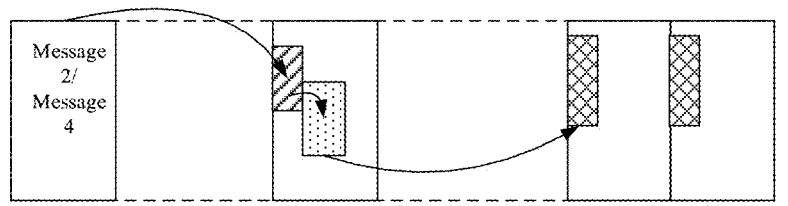
FIG. 3 is a first schematic diagram showing a specific implementation of a method of determining a downlink control channel resource in some embodiments of the present disclosure.

In the first type, as shown in FIG. 3, the base station carries the indication information of the first resource set configured to transmit the UE-specific physical downlink control channel (UE-specific PDCCH) of the user equipment in the Msg2 or the Msg4 of the random access procedure, so that the user equipment receives the Msg2 or the Msg4 successfully, and the first resource set carried therein can be obtained. Before the user equipment receives the RRC signaling successfully, the UE-specific PDCCH is required to be detected and received in the first resource set, so that the user equipment receives, on the UE-specific PDCCH, the scheduling information of the first RRC signaling sent by the base station after the user equipment accesses the network. After the user equipment is in a connected state and successfully receives the RRC signaling sent by the base station, the UE-specific PDCCH is detected and received according to the second resource set carried in the RRC signaling.

Due to the user equipment in the connected state, UE-specific PDCCH resource set thereof is configured by the RRC signaling, and the RRC signaling is required to be scheduled through the UE-specific PDCCH. Thus, the base station side is required to notify the base station by other means to schedule the resource set (i.e., the first resource set) in which the UE-specific PDCCH transmission of the first RRC signaling is located. In some embodiments of the present disclosure, the base station notifies and schedules, through the Msg2 or the Msg4, the resource set (i.e., the first resource set) in which the UE-specific PDCCH transmission of the first RRC signaling is located.

Figure 4:
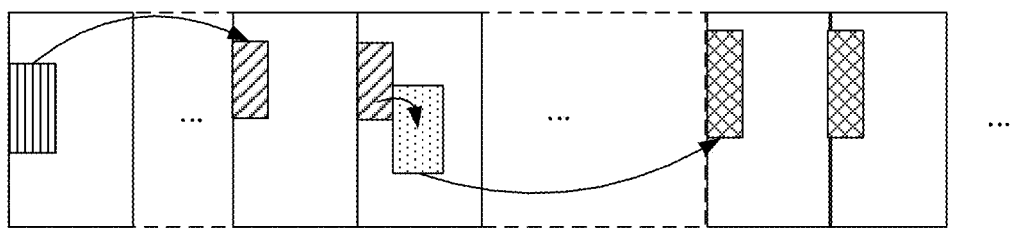
FIG. 4 is a second schematic diagram showing a specific implementation of a method of determining a downlink control channel resource in some embodiments of the present disclosure.

In the second type, as shown in FIG. 4, the base station configures, through the RMSI, the first resource set configured to transmit the UE-specific PDCCH. Before the user equipment is switched to the connected state, the UE-specific PDCCH thereof is detected and received both in the first resource set configured by the RMSI. The RMSI is valid for all user equipments, so the first resource set configured by the RMSI is shared for all user equipments that received the RMSI successfully. After the user equipment is switched to the connected state, and the RRC signaling is received successfully according to the scheduling information of the first RRC signaling received on the UE-specific PDCCH detected in the first resource set, the user equipment detects and receives the UE-specific PDCCH according to the second resource set configured in the RRC signaling.

In the third type, the base station notifies the user equipment of the resource set configured to transmit the common downlink control channel by using the MIB message, so that the user equipment can use the resource set as the first resource set configured to transmit the UE-specific PDCCH, and detect the UE-specific PDCCH in the first resource set, and the RRC signaling sent by the base station is received according to scheduling of the RRC signaling of the user equipment performed by the base station through the UE-specific PDCCH. That is, before the user equipment is switched to the connected state and receives the RRC signaling successfully, the user equipment detects, receives and schedules the UE-specific PDCCH the first RRC signaling in a resource set configured by the MIB configured to transmit the common downlink control channel.

After the use equipment is switched to the connected state and successfully receives the RRC signaling sent by the base station, the UE-specific PDCCH is detected and received according to the second resource set carried in the RRC signaling.

Figure 5:
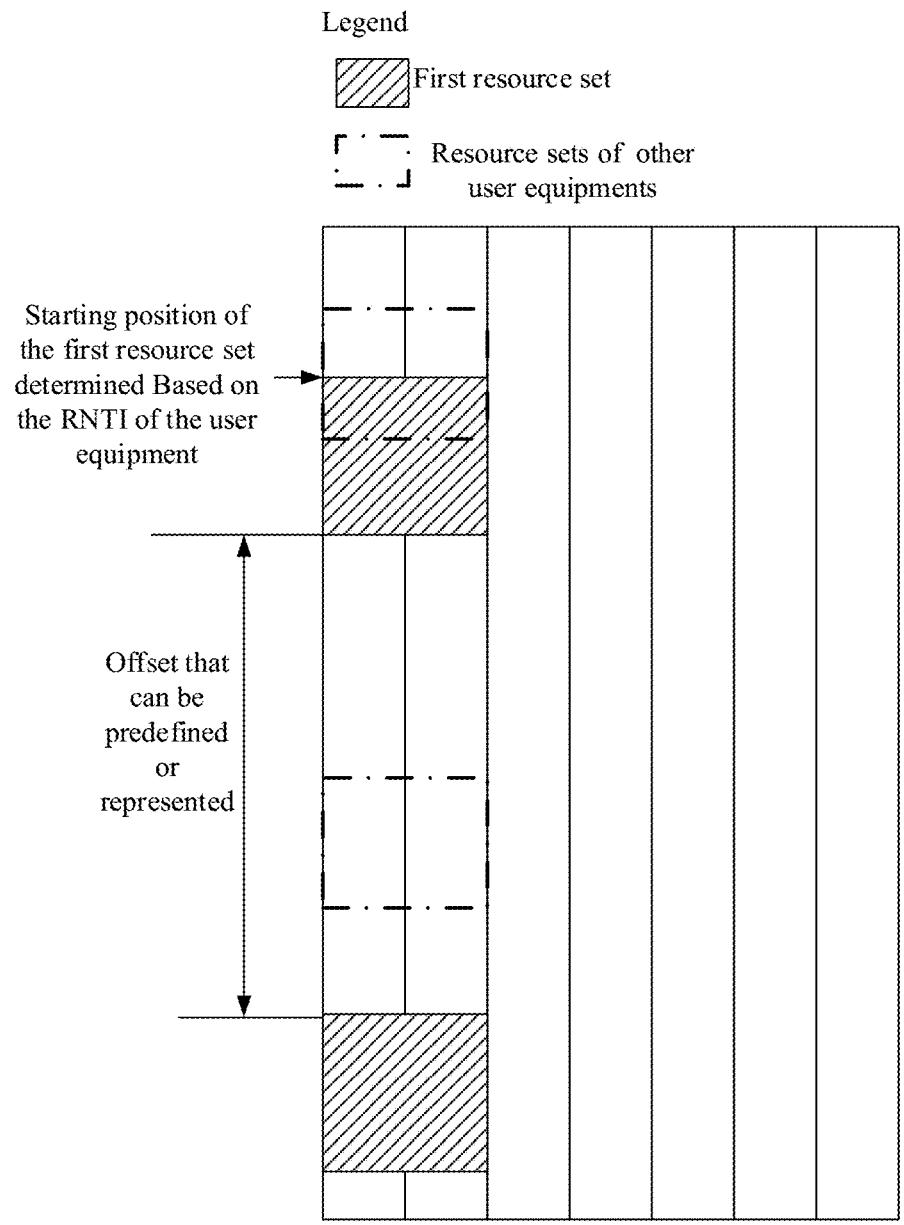
FIG. 5 is a third schematic diagram showing a specific implementation of a method of determining a downlink control channel resource in some embodiments of the present disclosure.

In the fourth type, as shown in FIG. 5, before the user equipment is switched to the connected state and successfully receives the RRC signaling, the user equipment detects and receives the UE-specific PDCCH in the first resource set determined in the predefinition manner, so that the user equipment receives the RRC signaling sent by the base station according to scheduling of the RRC signaling of the user equipment performed by the base station through the UE-specific PDCCH. After the use equipment is switched to the connected state and successfully receives the RRC signaling sent by the base station, the UE-specific PDCCH is detected and received according to the second resource set carried in the RRC signaling.

Starting position information of the first resource set is determined through the RNTI of the user equipment. The size of the first resource set is notified in an explicit signaling manner, or is determined in a protocol definition manner. At least one control resource set (CORESET) is included in the first resource set.

Figure 6:
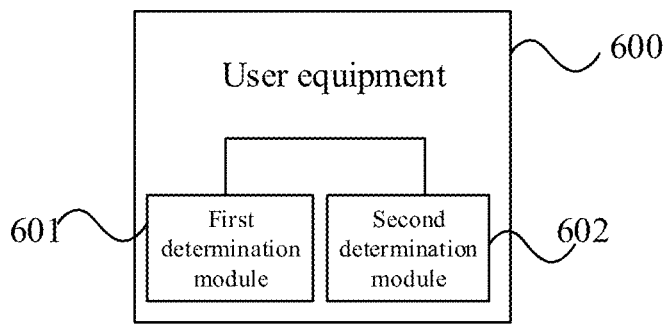
FIG. 6 is schematic diagram illustrating modules of a user equipment in some embodiments of the present disclosure.

A user equipment is provided in some embodiments of the present disclosure provide, as shown in FIG. 6, the user equipment 600 includes a first determination module 601 and a second determination module 602.

The first determination module 601 is configured to receive an indication message sent by a base station, and determine, according to the indication message, a first resource set configured to transmit a UE-specific physical downlink control channel of a user equipment; or The second determination module 602 is configured to determine the first resource set configured to transmit the UE-specific physical downlink control channel of the user equipment according to a protocol definition.

Optionally, the user equipment 600 further includes a channel detection module.

The channel detection module is configured to detect, in the first resource set, the UE-specific physical downlink control channel of the user equipment.

Optionally, the user equipment 600 further includes a scheduling information receiving module and a signaling receiving module.

The scheduling information receiving module is configured to receive, on the detected UE-specific physical downlink control channel of the user equipment, scheduling information of a first radio resource control signaling after the user equipment accesses a network; and The signaling receiving module is configured to receive the first radio resource control signaling according to the scheduling information of the first radio resource control signaling, where the first radio resource control signaling carries configuration information of a second resource set of the UE-specific physical downlink control channel configured by the base station for the user equipment.

Optionally, the user equipment 600 further includes a third determination module and a control information receiving module.

The third determination module is configured to determine the second resource set according to the configuration information of the second resource set carried in the received first radio resource control signaling; and The control information receiving module is configured to detect and receive, in the second resource set, control information transmitted on the UE-specific physical downlink control channel of the user equipment.

Optionally, the first determination module includes a first receiving unit.

The first receiving unit is configured to receive a message sent by the base station in a random access procedure of the user equipment, and determine the first resource set according to indication information of the first resource set carried in the message.

Optionally, the first determination module includes a second receiving unit.

The second receiving unit is configured to receive an RMSI message sent by the base station, and determine the first resource set according to indication information of the first resource set carried in the RMSI message;

The RMSI message is a system message other than a system message being a Master Information Block MIB message.

Optionally, the first determination module includes a third receiving unit.

The third receiving unit is configured to receive an MIB message sent by the base station, and determine a resource set which is obtained from the MIB message and used configured to transmit a common control channel as the first resource set.

Optionally, the second determination module includes a starting position determination module and a resource set determination module.

The starting position determination module is configured to, determine starting position information of the first resource set in the protocol definition based on a radio network temporary identity of the user equipment; and The resource set determination module is configured to determine the first resource set according to the starting position information of the first resource set and a pre-acquired size of the first resource set.

Optionally, the pre-acquired size of the first resource set is predefined in the protocol definition;

Optionally, the pre-acquired size of the first resource set is obtained by the user equipment from a message sent by the base station in a random access procedure of the user equipment, or is obtained by the user equipment from an RMSI message or an MIB message sent by the base station;

The RMSI message is a system message other than a system message being an MIB message.

Optionally, the message sent by the base station is an Msg2 or an Msg4 in the random access procedure of the user equipment.

For the above modules and units included in the user equipment, the functions of each module and unit may be implemented by a same physical device, or may be implemented by different physical devices.

For the user equipment that does not establish an RRC connection, the base station cannot configure, by using the RRC signaling, the resource set configured to transmit the UE-specific physical downlink control channel for the user equipment that does not establish the RRC connection. According to the some embodiments of the present disclosure, the resource set configured to transmit the UE-specific physical downlink control channel of the user equipment is determined in the manner indicated by the base station or in the predefined manner. As a result, by applying some embodiments of the present disclosure, a resource set configured to transmit a UE-specific physical downlink control channel of the user equipment is configured for the user equipment that does not established an RRC connection according to the manner indicated by the base station, and the flexible configuration of resources is realized.

Figure 7:
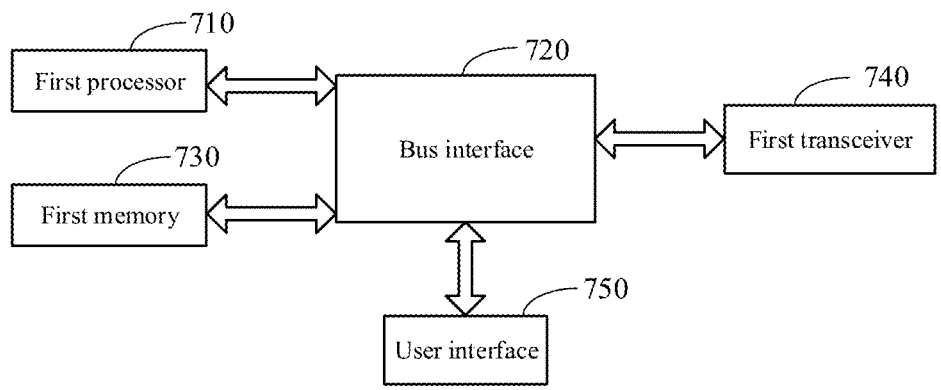
FIG. 7 is a structural block diagram illustrating a user equipment in some embodiments of the present disclosure.

In order to achieve the purpose better, as shown in FIG. 7, a user equipment is further provided in some embodiments of the present disclosure, including:

a first processor 710; a first memory 730 connected to the first processor 710 via a bus interface 720, the first memory 730 is configured to store a program and data used by the first processor 710 when performing an operation, and a first transceiver 740 coupled to the first processor 710 via the bus interface 720 for receiving and transmitting data under control of the first processor 710. When the first processor 710 calls and executes the program and data stored in the first memory 730, the following process is performed:

receiving an indication message sent by a base station, and determining, according to the indication message, a first resource set configured to transmit a UE-specific physical downlink control channel of a user equipment; or determine the first resource set configured to transmit the UE-specific physical downlink control channel of the user equipment according to a protocol definition.

After the determining a first resource set configured to transmit a UE-specific physical downlink control channel of a user equipment, the first processor 710 is also configured to:

detect, in the first resource set, the UE-specific physical downlink control channel of the user equipment.

After the detecting, in the first resource set, the UE-specific physical downlink control channel of the user equipment, the first processor 710 is also configured to:

receive, on the detected UE-specific physical downlink control channel of the user equipment, scheduling information of a first radio resource control signaling after the user equipment accesses a network; and receive the first radio resource control signaling according to the scheduling information of the first radio resource control signaling, where the first radio resource control signaling carries configuration information of a second resource set of the UE-specific physical downlink control channel configured by the base station for the user equipment.

After the receiving the first radio resource control signaling according to the scheduling information of the first radio resource control signaling, the first processor 710 is also configured to:

determine the second resource set according to the configuration information of the second resource set carried in the received first radio resource control signaling; and detect and receive, in the second resource set, control information transmitted on the UE-specific physical downlink control channel of the user equipment.

When receiving an indication message sent by a base station, and determining, according to the indication message, a first resource set configured to transmit a UE-specific physical downlink control channel of a user equipment, the first processor 710 is specifically configured to:

receive a message sent by the base station in a random access procedure of the user equipment, and determine the first resource set according to indication information of the first resource set carried in the message.

When receiving an indication message sent by a base station, and determining, according to the indication message, a first resource set configured to transmit a UE-specific physical downlink control channel of a user equipment, the first processor 710 is specifically configured to:

receive an RMSI message sent by the base station, and determine the first resource set according to indication information of the first resource set carried in the RMSI message;

where the RMSI message and a Master Information Block MIB message are comprised in a system message.

When receiving an indication message sent by a base station, and determining, according to the indication message, a first resource set configured to transmit a UE-specific physical downlink control channel of a user equipment, the first processor 710 is specifically configured to:

receive an MIB message sent by the base station, and determine a resource set which is obtained from the MIB message and configured to transmit a common control channel as the first resource set.

When determining the first resource set configured to transmit the UE-specific physical downlink control channel of the user equipment according to a protocol definition, the first processor 710 is specifically configured to:

determine starting position information of the first resource set in the protocol definition, based on a radio network temporary identity of the user equipment; and determine the first resource set according to the starting position information of the first resource set and a pre-acquired size of the first resource set.

The pre-acquired size of the first resource set is predefined in the protocol definition; or The pre-acquired size of the first resource set is obtained by the user equipment from a message sent by the base station in a random access procedure of the user equipment, or is obtained by the user equipment from an RMSI message or an MIB message sent by the base station;

The RMSI message is a system message other than a system message being an MIB message.

The message sent by the base station is an Msg2 or an Msg4 in the random access procedure of the user equipment.

It should be noted that, in the FIG. 7, the bus architecture may include any number of interconnected buses and bridges, specifically linked by one or more processors represented by the first processor 710 and various circuits of the memory represented by the first memory 730. The bus architecture can also link various other circuits such as peripherals, voltage regulators, and power management circuits, etc., which are well known in the art and, therefore, will not be further described herein. The bus interface provides an interface. The first transceiver 740 can be a plurality of components, that is, including a transmitter and a transceiver, to provide units for communicating with various other devices on a transmission medium. For different terminals, the user interface 750 may also be an interface capable of externally connecting the required devices, including but not limited to a keypad, a display, a speaker, a microphone, a joystick, and the like. The first processor 710 is responsible for managing the bus architecture and general processing, and the first memory 730 can store data used by the first processor 710 when performing operations.

It will be understood by those skilled in the art that all or some steps for implementing the above embodiments may be implemented by hardware, or may be implemented by a computer program indicating related hardware, and the computer program includes instructions for performing some or all of the above steps; and the computer program can be stored in a readable storage medium, which can be a storage medium in any form.

In addition, it should be noted that, in the apparatus and method of the present disclosure, it is apparent that various components or steps may be decomposed and/or recombined. These decompositions and/or recombinations should be considered as equivalents to the present disclosure. Also, the steps for performing the above-described series of processes may naturally be performed in chronological order in the order illustrated, but do not have to be performed in chronological order and some steps may be performed in parallel or independently of each other. It will be appreciated by those skilled in the art that all or any of the steps or components of the methods and devices of the present disclosure may be implemented in any computing device (including a processor, a storage medium, etc.) or a network of a computing device through hardware, firmware, software, or a combination thereof, this can be implemented by the ordinary skill in the art using their basic programming skills after they read the description of the present disclosure.

Accordingly, the objects of the present disclosure can also be achieved by running a program or a set of programs on any computing device. The computing device can be a well-known general purpose device. Accordingly, the objects of the present disclosure may also be realized by merely providing a program product including program code for implementing the method or device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and method of the present disclosure, it is apparent that various components or steps may be decomposed and/or recombined. The decomposition and/or recombination should be considered as equivalents to the present disclosure. Also, the steps of performing the series of processes described above may naturally be performed in chronological order in the order illustrated, but not necessarily be required to be performed in chronological order. Certain steps may be performed in parallel or independently of one another.

A computer readable storage medium having a computer program stored thereon is further provided in some embodiments of the present disclosure, and the program is executed to implement the following steps.

receiving an indication message sent by a base station, and determining, according to the indication message, a first resource set configured to transmit a UE-specific physical downlink control channel of a user equipment; or determining the first resource set configured to transmit the UE-specific physical downlink control channel of the user equipment according to a protocol definition.

After the determining a first resource set configured to transmit a UE-specific physical downlink control channel of a user equipment, the program is executed to implement the following step.

detecting, in the first resource set, the UE-specific physical downlink control channel of the user equipment.

After the detecting, in the first resource set, the UE-specific physical downlink control channel of the user equipment, the program is executed to implement the following steps.

receiving, on the detected UE-specific physical downlink control channel of the user equipment, scheduling information of a first radio resource control signaling after the user equipment accesses a network; and receiving the first radio resource control signaling according to the scheduling information of the first radio resource control signaling, where the first radio resource control signaling carries configuration information of a second resource set of the UE-specific physical downlink control channel configured by the base station for the user equipment.

After the receiving the first radio resource control signaling according to the scheduling information of the first radio resource control signaling, the program is executed to implement the following steps.

determining the second resource set according to the configuration information of the second resource set carried in the received first radio resource control signaling; and detecting and receiving, in the second resource set, control information transmitted on the UE-specific physical downlink control channel of the user equipment.

The receiving an indication message sent by a base station, and determining, according to the indication message, a first resource set configured to transmit a UE-specific physical downlink control channel of a user equipment includes:

receiving a message sent by the base station in a random access procedure of the user equipment, and determining the first resource set according to indication information of the first resource set carried in the message.

The receiving an indication message sent by a base station, and determining, according to the indication message, a first resource set configured to transmit a UE-specific physical downlink control channel of a user equipment includes:

receiving an RMSI message sent by the base station, and determining the first resource set according to indication information of the first resource set carried in the RMSI message;

where the RMSI message is a system message other than a system message being a Master Information Block MIB message.

The receiving an indication message sent by a base station, and determining, according to the indication message, a first resource set configured to transmit a UE-specific physical downlink control channel of a user equipment includes:

receiving an MIB message sent by the base station, and determining a resource set which is obtained from the MIB message and used configured to transmit a common control channel as the first resource set.

The determining the first resource set configured to transmit the UE-specific physical downlink control channel of the user equipment according to a protocol definition includes:

determining starting position information of the first resource set in the protocol definition, based on a radio network temporary identity of the user equipment; and determining the first resource set according to the starting position information of the first resource set and a pre-acquired size of the first resource set.

The pre-acquired size of the first resource set is predefined in the protocol definition; or The pre-acquired size of the first resource set is obtained by the user equipment from a message sent by the base station in a random access procedure of the user equipment, or is obtained by the user equipment from an RMSI message or an MIB message sent by the base station;

The RMSI message is a system message other than a system message being an MIB message.

The message sent by the base station is an Msg2 or an Msg4 in the random access procedure of the user equipment.

Figure 8:
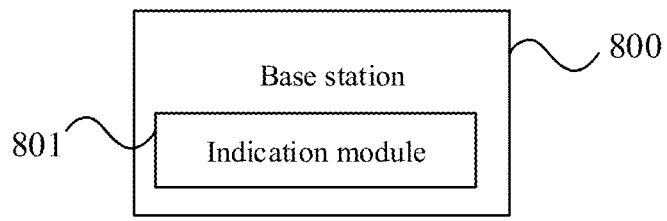
FIG. 8 is schematic diagram illustrating a module of a base station in some embodiments of the present disclosure.

A base station is further provided in some embodiments of the present disclosure, as shown in FIG. 8, and the base station 800 includes an indication module 801.

The indication module 801 is configured to send an indication message to a user equipment, the indication information is configured to enable the user equipment to determine a first resource set configured to transmit a UE-specific physical downlink control channel of the user equipment.

Optionally, the base station 800 further includes a scheduling information sending module, a resource configuration module and a signaling sending module.

The scheduling information sending module is configured to send, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling.

The resource configuration module is configured to configure, for the user equipment, a second resource set configured to transmit the UE-specific physical downlink control channel of the user equipment.

The signaling sending module is configured to send to the user equipment configuration information of the second resource set as information carried in the first radio resource control signaling.

Optionally, the base station 800 further includes a control information transmission module.

The control information transmission module is configured to, in the second resource set, transmit control information on the UE-specific physical downlink control channel of the user equipment.

Optionally, the indication module includes a first sending unit.

The first sending unit is configured to send to the user equipment the indication information of the first resource set as information carried in a message sent by the base station to the user equipment in a random access procedure of the user equipment.

Optionally, the indication module includes a second sending unit.

The second sending unit is configured to send to the user equipment the indication information of the first resource set as information carried in an RMSI message.

The RMSI message is a system message other than a system message being a Master Information Block MIB message.

Optionally, the indication module includes a third sending unit.

The third sending unit is configured to send an MIB message to the user equipment, to enable the user equipment to determine a resource set which is obtained from the MIB message and used configured to transmit a common control channel, as the first resource set.

Optionally, the base station 800 further includes a resource size sending module.

The resource size sending module is configured to send to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

Optionally, the message sent by the base station in the random access procedure of the user equipment is an Msg2 or an Msg4.

For the above modules and units included in the base station, the functions of each module and unit may be implemented by a same physical device, or may be implemented by different physical devices.

For the user equipment that does not establish an RRC connection, the base station cannot configure, by using the RRC signaling, the resource set configured to transmit the UE-specific physical downlink control channel for the user equipment that does not establish the RRC connection. According to the some embodiments of the present disclosure, the base station determines the resource set configured to transmit the UE-specific physical downlink control channel of the user equipment by means of indication. As a result, by applying some embodiments of the present disclosure, a resource set configured to transmit a UE-specific physical downlink control channel of the user equipment is configured for the user equipment that does not established an RRC connection according to the manner indicated by the base station, and the flexible configuration of resources is realized.

Figure 9:
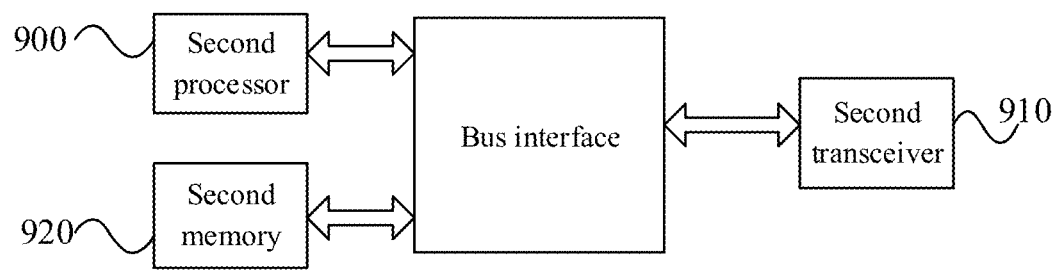
FIG. 9 is a structural block diagram illustrating a base station in some embodiments of the present disclosure.

As shown in FIG. 9, some embodiments of the present disclosure provide a base station, including: a second memory 920, a second processor 900 and a computer program stored in the second memory 920 and executable on the second processor 900; the second processor 900 is configured to read the program in the second memory 920 and control a second transceiver 910 to execute the following step.

An indication message is sent to a user equipment, the indication information is configured to enable the user equipment to determine a first resource set configured to transmit a UE-specific physical downlink control channel of the user equipment.

In FIG. 9, the bus architecture may include any number of interconnected buses and bridges, specifically linked by one or more processors represented by the second processor 900 and various circuits of the memory represented by the second memory 920. The bus architecture can also link various other circuits such as peripherals, voltage regulators, and power management circuits, etc., which are well known in the art and, therefore, will not be further described herein. The bus interface provides an interface. The second transceiver 910 can be a plurality of components, that is, including a transmitter and a transceiver, to provide units for communicating with various other devices on a transmission medium. The second processor 900 is responsible for managing the bus architecture and general processing, and the second memory 920 can store data used by the second processor 900 when performing operations.

After the second transceiver 910 sends the indication message to the user equipment, the second processor 900 is further configured to:

control the second transceiver 910 to send, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling;

configure, for the user equipment, a second resource set configured to transmit the UE-specific physical downlink control channel of the user equipment;

control the second transceiver 910 to send to the user equipment configuration information of the second resource set as information carried in the first radio resource control signaling.

After the second transceiver 910 sends configuration information of the second resource set to the user equipment as carrying information of the first radio resource control signaling, the second processor 900 is further configured to:

in the second resource set, transmit control information on the UE-specific physical downlink control channel of the user equipment.

When sending an indication message to a user equipment, the second transceiver 910 is specifically configured to:

send to the user equipment the indication information of the first resource set to the user equipment as information carried in a message sent by the base station in a random access procedure of the user equipment.

When sending an indication message to a user equipment, the second transceiver 910 is specifically configured to:

send to the user equipment the indication information of the first resource set as information carried in an RMSI message;

where the RMSI message is a system message other than a system message being an MIB message.

When sending an indication message to a user equipment, the second transceiver 910 is specifically configured to:

send an MIB message to the user equipment, to enable the user equipment determines a resource set which is obtained from the MIB message and used configured to transmit a common control channel as the first resource set.

The second transceiver 910 is further configured to:

send to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

The message sent by the base station in the random access procedure of the user equipment is an Msg2 or an Msg4.

A computer readable storage medium having a computer program stored thereon is further provided in some embodiments of the present disclosure, and the program is executed by a processor to implement the following step.

sending an indication message to a user equipment, the indication information is configured to enable the user equipment to determine a first resource set configured to transmit a UE-specific physical downlink control channel of the user equipment.

After the sending an indication message to a user equipment, the program is executed by the processor to implement the following steps.

sending, on the UE-specific physical downlink control channel of the user equipment, to the user equipment scheduling information of a first radio resource control signaling after the user equipment accesses a network, o enable the user equipment to detect, in the determined first resource set, the UE-specific physical downlink control channel of the user equipment, and receive the scheduling information of the first radio resource control signaling;

configuring, for the user equipment, a second resource set configured to transmit the UE-specific physical downlink control channel of the user equipment; and sending to the user equipment configuration information of the second resource set as information carried in the first radio resource control signaling.

After the sending to the user equipment configuration information of the second resource set as information carried in the first radio resource control signaling, the program is executed by the processor to implement the following step.

in the second resource set, transmitting control information on the UE-specific physical downlink control channel of the user equipment.

The sending an indication message to a user equipment includes:

sending to the user equipment the indication information of the first resource set as information carried in a message sent by the base station to the user equipment in a random access procedure of the user equipment.

The sending an indication message to a user equipment includes:

sending to the user equipment the indication information of the first resource set as information carried in an RMSI message;

where the RMSI message is a system message other than a system message being a Master Information Block MIB message.

The sending an indication message to a user equipment includes:

sending an MIB message to the user equipment, to enable the user equipment determines a resource set which is obtained from the MIB message and used configured to transmit a common control channel as the first resource set.

The method further includes:

sending to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

where the message sent by the base station in the random access procedure of the user equipment is an Msg2 or an Msg4.

The above are only some embodiments of the present disclosure, and it should be noted that those skilled in the art may also make several improvements and refinements without departing from the principles of the present disclosure, which should be considered as the scope of the present disclosure.

What is claimed is:

1. A method of determining a downlink control channel resource, comprising:

receiving an indication message sent by a base station, and determining, according to the indication message, a first resource set configured to transmit a UE-specific physical downlink control channel of a user equipment; or determining the first resource set configured to transmit the UE-specific physical downlink control channel of the user equipment according to a protocol definition; wherein the receiving of the indication message sent by the base station, and determining, according to the indication message, the first resource set configured to transmit the UE-specific physical downlink control channel of the user equipment comprises:

receiving a message sent by the base station in a random access procedure of the user equipment, and determining the first resource set according to indication information of the first resource set carried in the message;

or
the receiving of the indication message sent by the base station, and determining, according to the indication message, the first resource set configured to transmit the UE-specific physical downlink control channel of the user equipment comprises:
receiving an RMSI message sent by the base station, and determining the first resource set according to indication information of the first resource set carried in the RMSI message;
wherein the RMSI message is a system message other than a system message being a Master Information Block MIB message;
or
the receiving of the indication message sent by the base station, and determining, according to the indication message, the first resource set configured to transmit the UE-specific physical downlink control channel of the user equipment comprises:
receiving an MIB message sent by the base station, and determining a resource set which is obtained from the MIB message and used configured to transmit a common control channel as the first resource set.

2. The method according to claim 1, wherein subsequent to the determining the first resource set configured to transmit the UE-specific physical downlink control channel of the user equipment, the method further comprises:
detecting, in the first resource set, the UE-specific physical downlink control channel of the user equipment.

3. The method according to claim 2, wherein subsequent to the detecting, in the first resource set, the UE-specific physical downlink control channel of the user equipment, the method further comprises:
receiving, on the detected UE-specific physical downlink control channel of the user equipment, scheduling information of a first radio resource control signaling after the user equipment accesses a network; and
receiving the first radio resource control signaling according to the scheduling information of the first radio resource control signaling, wherein the first radio resource control signaling carries configuration information of a second resource set of the UE-specific physical downlink control channel configured by the base station for the user equipment.

4. The method according to claim 3, wherein subsequent to the receiving the first radio resource control signaling according to the scheduling information of the first radio resource control signaling, the method further comprises:
determining the second resource set according to the configuration information of the second resource set carried in the received first radio resource control signaling; and
detecting and receiving, in the second resource set, control information transmitted on the UE-specific physical downlink control channel of the user equipment.

5. The method according to claim 1, wherein the determining the first resource set configured to transmit the UE-specific physical downlink control channel of the user equipment according to the protocol definition comprises:
determining starting position information of the first resource set in the protocol definition, based on a radio network temporary identity of the user equipment; and
determining the first resource set according to the starting position information of the first resource set and a pre-acquired size of the first resource set.

6. The method according to claim 5, wherein the size of the first resource set is predefined in the protocol definition;
or
the size of the first resource set is obtained by the user equipment from a message sent by the base station in a random access procedure of the user equipment, or is obtained by the user equipment from an RMSI message or an MIB message sent by the base station;
wherein the RMSI message is a system message other than a system message being an MIB message.

7. The method according to claim 1, wherein the message sent by the base station in the random access procedure of the user equipment is an Msg2 or an Msg4.

8. A method of determining a downlink control channel resource, comprising:
sending an indication message to a user equipment, wherein the indication message is configured to enable the user equipment to determine a first resource set configured to transmit a UE-specific physical downlink control channel of the user equipment;
wherein
the sending of the indication message to the user equipment comprises:
sending to the user equipment the indication information of the first resource set as information carried in a message sent by the base station to the user equipment in a random access procedure of the user equipment;
or
the sending of the indication message to the user equipment comprises:
sending to the user equipment the indication information of the first resource set as information carried in an RMSI message;
wherein the RMSI message is a system message other than a system message being a Master Information Block MIB message;
or
the sending of the indication message to the user equipment comprises:
sending an MIB message to the user equipment, to enable the user equipment to determine a resource set which is obtained from the MIB message and used configured to transmit a common control channel as the first resource set.

9. The method according to claim 8, wherein subsequent to the sending an indication message to a user equipment, the method further comprises:
sending, on the UE-specific physical downlink control channel of the user equipment, to the user equipment scheduling information of a first radio resource control signaling after the user equipment accesses a network, to enable the user equipment to detect, in the determined first resource set, the UE-specific physical downlink control channel of the user equipment, and receive the scheduling information of the first radio resource control signaling;
configuring, for the user equipment, a second resource set configured to transmit the UE-specific physical downlink control channel of the user equipment; and
sending to the user equipment configuration information of the second resource set as information carried in the first radio resource control signaling.

10. The method according to claim 9, wherein subsequent to the sending to the user equipment the configuration information of the second resource set as the information carrying in the first radio resource control signaling, the method further comprises:

in the second resource set, transmitting control information on the UE-specific physical downlink control channel of the user equipment.

11. The method according to claim 8, further comprising: sending to the user equipment a size of the first resource set as an RMSI message, or an MIB message, or information carried in a message sent by the base station in a random access procedure of the user equipment, to enable the user equipment to determine the first resource set according to the size of the first resource set and starting position information of the first resource set determined in a protocol definition and based on a radio network temporary identity of the user equipment.

12. The method according to claim 8, wherein the message sent by the base station in the random access procedure of the user equipment is an Msg2 or an Msg4.

13. A user equipment, comprising a first memory, a first processor and a computer program stored in the first memory and executable on the first processor; wherein the first processor is configured to execute the computer program to:
receive an indication message sent by a base station, and determine, according to the indication message, a first resource set configured to transmit a UE-specific physical downlink control channel of a user equipment; or
determine the first resource set configured to transmit the UE-specific physical downlink control channel of the user equipment according to a protocol definition; and
wherein
the first processor is configured to execute the computer program to:
receive a message sent by the base station in a random access procedure of the user equipment, and determine the first resource set according to indication information of the first resource set carried in the message;
or
the first processor is configured to execute the computer program to:
receive an RMSI message sent by the base station, and determine the first resource set according to indication information of the first resource set carried in the RMSI message;
wherein the RMSI message is a system message other than a system message being a Master Information Block MIB message;
or
the first processor is configured to execute the computer program to:
receive an MIB message sent by the base station, and determine a resource set which is obtained from the MIB message and used configured to transmit a common control channel as the first resource set.

14. A base station, comprising a second memory, a second processor and a computer program stored in the second memory and executable on the second processor; wherein the second processor executes the program to perform the method of determining a downlink control channel resource according to claim 8.

* * * * *